United States Patent [19]
Erbes et al.

[11] Patent Number: 5,978,433
[45] Date of Patent: Nov. 2, 1999

[54] JET PUMP WEDGE LOCKING SUPPORT APPARATUS

[75] Inventors: John Geddes Erbes, Mt. View; Gerald Alan Deaver, San Jose, both of Calif.

[73] Assignee: General Electric Company, Schenectady, N.Y.

[21] Appl. No.: 09/217,980

[22] Filed: Dec. 21, 1998

[51] Int. Cl.$^6$ .................................................. G21C 15/25
[52] U.S. Cl. ............................................................ 376/372
[58] Field of Search ................................. 376/260, 285, 376/372, 392, 407

[56] References Cited

U.S. PATENT DOCUMENTS 4,675,149   6/1987   Perry et al. ............................... 376/372

*Primary Examiner*—Daniel D. Wasil
*Attorney, Agent, or Firm*—Armstrong Teasdale LLP

[57] ABSTRACT

A wedge locking support apparatus that applies a downward preload force to a jet pump inlet mixer gravity wedge and is remotely installable without disassembly of the jet pumps is described. The downward force supplied by the wedge locking support apparatus supplements the force supplied by the weight of the gravity wedge and improves the lateral support provided to the inlet mixer by the gravity wedge. The wedge locking support apparatus includes an upper leaf spring assembly configured to engage the gravity wedge bracket, a lower leaf spring assembly slidably coupled to the upper leaf spring assembly and configured to engage the top of the wedge, and a jack bolt coupled to the upper and lower assemblies.

22 Claims, 4 Drawing Sheets

JET PUMP WEDGE LOCKING SUPPORT APPARATUS

BACKGROUND OF THE INVENTION

This invention relates generally to nuclear reactors and more particularly, to apparatus for repairing jet pump assemblies within a nuclear reactor pressure vessel.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within restrainer brackets by a gravity actuated wedge. The restrainer brackets support the inlet mixer by attaching the inlet mixer to the adjacent jet pump riser pipe.

The gravity actuated wedge maintains contact between the inlet mixer and the restrainer bracket. More specifically, the wedge works in cooperation with two set screws which are tack welded to the restrainer bracket to maintain contact with the inlet mixer. The flow of water through the jet pumps typically includes pressure fluctuations caused by various sources in the reactor system. The pressure fluctuations may have frequencies close to one or more natural vibration modes of the jet pump piping. The jet pump piping stability depends on the tight fit-up, or contact, of the restrainer brackets and the inlet mixers.

Operating thermal gradients, hydraulic loads, and fluctuations in the hydraulic loads can overcome the lateral support provided by the gravity wedge, allowing gaps or clearances to develop at the opposing two fixed contacts or set screws. Particularly, the tack welds can break and the set screws can loosen permitting the jet pump to vibrate within the restrainer bracket. The loss of contact between the inlet mixer and the restrainer bracket can change the jet pump natural frequency to match some excitation frequency in the system, causing vibration of the piping. The vibration exerts increased loads on the piping system which may cause cyclic fatigue cracking and wear of the piping supports. This can result in degradation from wear and fatigue at additional jet pump structural supports.

Gravity wedge supports have been used at locations where clearances have developed in restrainer bracket contacts in order to overcome this problem. The gravity wedge support employs a sliding wedge and a fixed bracket mount which engages the jet pump restrainer bracket. Proper installation of the wedge support requires disassembly of the jet pumps, which is an undesirable expense and may cause an extension of reactor maintenance downtime. Additionally, the gravity wedge supports typically include bolted attachments which could vibrate loose. Another attempted solution is to reinforce the welded attachment of the two set screws to the restrainer bracket, then reset the inlet mixer against the set screws when the jet pump is reassembled. However, this procedure also requires significant downtime and disassembling the jet pumps. Neither of these modifications provide an improvement in the effectiveness of the existing gravity wedge to provide lateral support to the inlet mixer in the restrainer bracket.

It would be desirable to provide a wedge preload apparatus that attaches to the jet pump gravity wedge to improve the effectiveness of the gravity wedge. It would also be desirable to provide a wedge preload apparatus that initially adjusted to the variable positioning of the gravity wedge and maintained a preload force while compensating for the downward displacement of the gravity wedge due to possible wear after installation.

BRIEF SUMMARY OF THE INVENTION

These and other objects may be attained by a wedge locking support apparatus that applies a downward preload force to a jet pump inlet mixer gravity wedge and is remotely installable without disassembly of the jet pumps. The downward force supplied by the wedge locking support apparatus supplements the force supplied by the weight of the gravity wedge and improves the lateral support provided to the inlet mixer by the gravity wedge. In one embodiment, the wedge locking support apparatus includes an upper leaf spring assembly, a lower leaf spring assembly slidably coupled to the upper leaf spring assembly, and a jack bolt coupled to the upper and lower assemblies.

The upper leaf spring assembly includes a pair of leaf spring arms depending perpendicularly from a flat elongate portion of the upper assembly. The leaf spring arms are located parallel to each other and are configured to straddle the gravity wedge mounting bolt. Positioning lugs depend from the ends of each spring arm, and are configured to engage the wedge bracket to hold the apparatus in place when a preload force is applied to the gravity wedge.

The upper leaf spring assembly also includes a guide portion depending perpendicularly from an end of the elongate portion. The guide portion includes a jack bolt opening. Two guide arms depend from the guide portion. The guide arms are located adjacent to the two leaf spring arms of the upper leaf spring assembly, and are configured to be aligned with the leaf spring arms. One guide arm includes a pivoting latch assembly configured to lock the wedge locking support apparatus to the gravity wedge mounting bracket. The other guide arm includes a locking beam coupled to the guide arm and configured to engage the jack bolt.

The lower leaf spring assembly includes two leaf spring arms depending from a block portion. The leaf spring arms are configured to be aligned with the leaf spring arms of the upper assembly. The leaf spring arms are located parallel to each other and are configured to straddle the gravity wedge mounting bolt. Positioning lugs depend from the ends of each spring arm, and are configured to engage the top edge of the gravity wedge to hold the apparatus in place when a preload force is applied to the gravity wedge. The block portion of the lower assembly includes a channel configured to receive the elongate portion of the upper leaf spring assembly and slidably couple the upper and lower leaf spring assemblies. The block portion also includes a threaded jack bolt opening configured to threadenly engage the jack bolt.

The jack bolt includes a bolt head and a plurality of ratchet teeth around the periphery of the bolt head. The jack bolt is configured to extend through the jack bolt opening in the upper leaf spring assembly and threadenly engage the jack bolt opening in the lower leaf spring assembly. An end of the locking beam coupled to a guide arm of the upper leaf spring assembly engages the ratchet teeth of the jack bolt.

The wedge locking support apparatus is installed in the reactor on the jet pump inlet mixer gravity wedge by first preassembling the components. Particularly, the elongate portion of the upper leaf spring assembly is inserted into the channel of the lower leaf spring assembly. The jack bolt is then inserted through the jack bolt opening in the upper spring assembly and threadenly engaged with the threaded jack bolt opening of the lower spring assembly.

The apparatus is then lowered into position on the gravity wedge so that the upper leaf spring positioning lugs engage the horizontal portion of the wedge bracket. The pivoting latch is then closed to engage the horizontal portion of the wedge bracket locking the apparatus to the bracket. The latch includes a self locking spring detent engagement to keep the latch closed.

A socket tool is then used to tighten the jack bolt to a predetermined torque which moves the lower leaf spring arms into engagement with the gravity wedge clamping the apparatus securely to the wedge and the mounting bracket. The action of the upper leaf spring arms engaging the wedge bracket and the lower leaf spring arms engaging the top of the gravity wedge imparts a downward force on the wedge as the jack screw is tightened. The leaf spring arms are configured to deflect under the applied jack bolt preload which permits the apparatus to maintain the load on the wedge even if the gravity wedge moves downward during operation of the reactor.

The above described wedge locking support apparatus is remotely installable on the inlet mixer gravity wedge and improves the effectiveness of the wedge. The apparatus imparts a downward preload force to the wedge which supplements the force supplied by the weight or the wedge. The leaf spring arms deflect under the preload which permits the apparatus to maintain the load on the wedge even if the wedge moves downward during operation of the reactor.

DETAILED DESCRIPTION OF THE INVENTION

Figure 1:
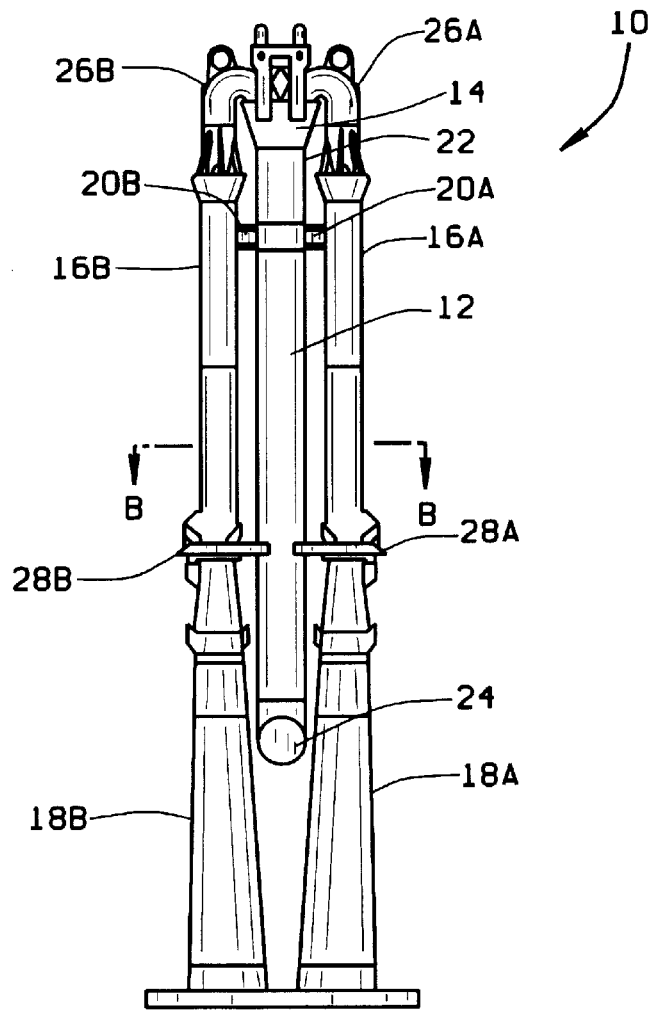
FIG. 1 is a side view of a boiling water nuclear reactor jet pump assembly.

FIG. 1 is a side view of a boiling water nuclear reactor jet pump assembly 10. Water flows through jet pump assembly 10 and into the reactor core (not shown). Jet pump assembly 10 includes a riser assembly 12, a transition assembly 14, two inlet mixer assemblies 16A and 16B, and two diffuser assemblies 18A and 18B. Particularly, riser assembly 12 is supported by riser braces 20A and 20B which couple riser 12 to the reactor vessel (not shown). Transition assembly 14 is coupled to the upper end 22 of riser 12 to split the flow of water into two paths, one through inlet mixer 16A and the other through inlet mixer 16B. Water enters riser assembly 12 through jet pump inlet nozzle 24. Inlet mixers 16A and 16B are coupled at one end to transition piece 14 by elbows 26A and 26B respectively, and at an opposite end to jet pump diffuser assemblies 18A and 18B respectively. For support and to prevent pipe vibrations, restrainer brackets 28A and 28B couple inlet mixer assemblies 16A and 16B to riser pipe 12.

Figure 2:
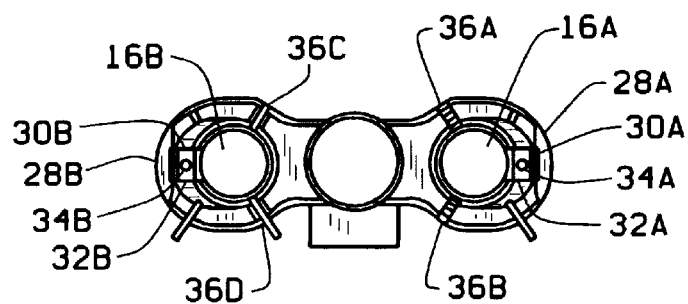
FIG. 2 is a cross sectional view through line B—B of the jet pump assembly shown in FIG. 1.

Referring to FIG. 2, wedges 30A and 30B are positioned between restrainer brackets 28A and 28B and inlet mixers 16A and 16B by wedge brackets 32A and 32B respectively. Wedge bolts 34A and 34B couple wedges 30A and 30B to wedge brackets 32A and 32B respectively, and are configured to permit wedges 30A and 30B to slide on bolts 34A and 34B. Screw contacts 36A, 36B, 36C, and 36D extend through restrainer brackets 28A and 28B and contact mixers 16A and 16B respectively to provide a tight rigid fit-up. Screw contacts 36A and 36B are each located 120° away from wedge 30A in restrainer bracket 28A, and screw contacts 36C and 36D are each located 120° away from wedge 30B in restrainer bracket 28B. Typically set screws 36A, 36B, 36C, and 36D are tack welded to restrainer brackets 28A and 28B to prevent set screws 36A, 36B, 36C, and 36D from loosening. However, because of the severe conditions present in the reactor vessel, combined with insufficient wedge support, the tack welds may fail. This may permit set screws 36A, 36B, 36C, and 36 D to loosen which will destroy the tight rigid fit-up of inlet mixers 16A and 16B in restrainer brackets 28A and 28B. Without a rigid fit-up, inlet mixers 16A and 16B may vibrate which is an undesirable condition.

Figure 3:
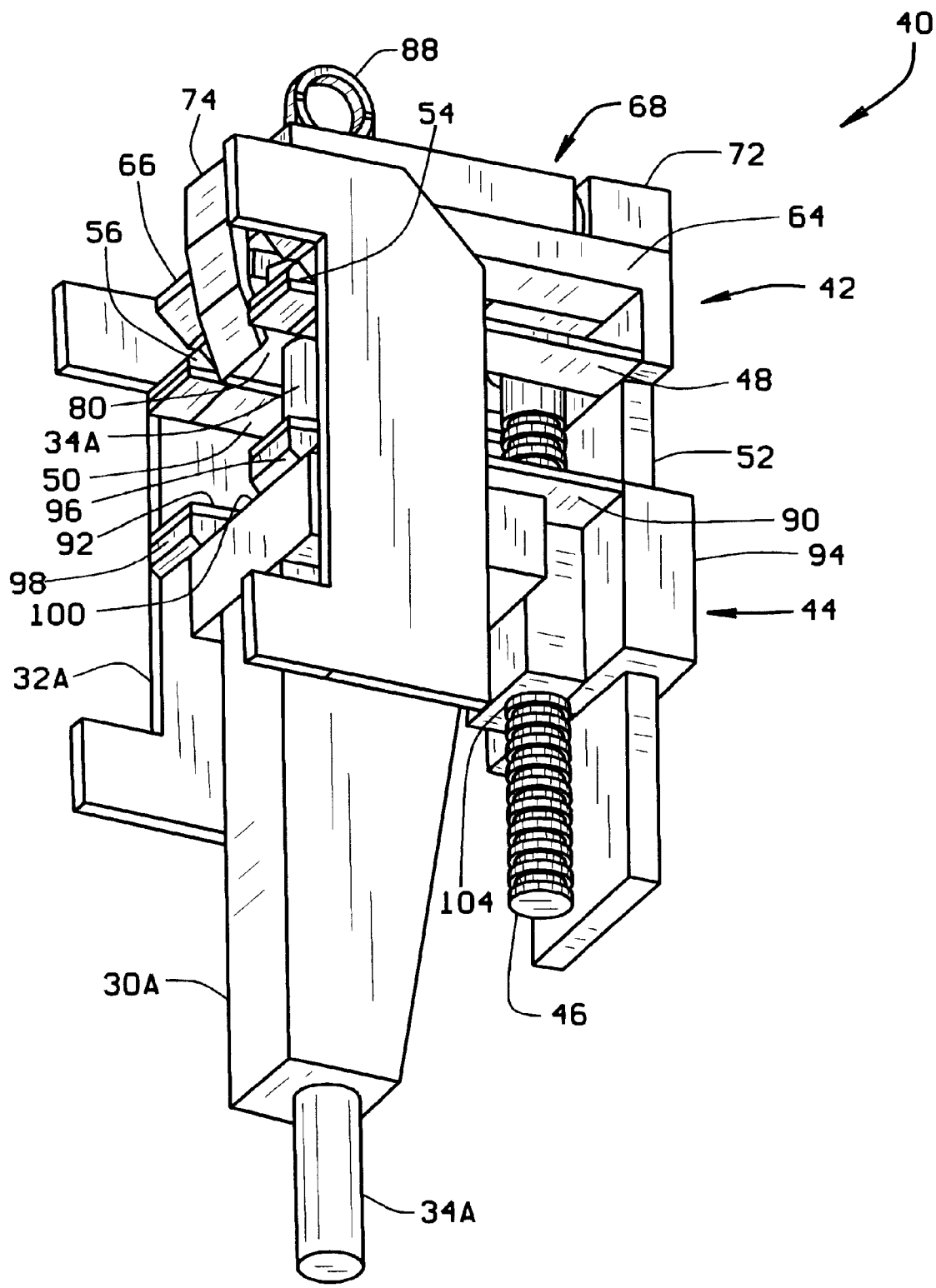
FIG. 3 is a bottom perspective view of a wedge locking support apparatus in accordance with an embodiment of the present invention.
Figure 4:
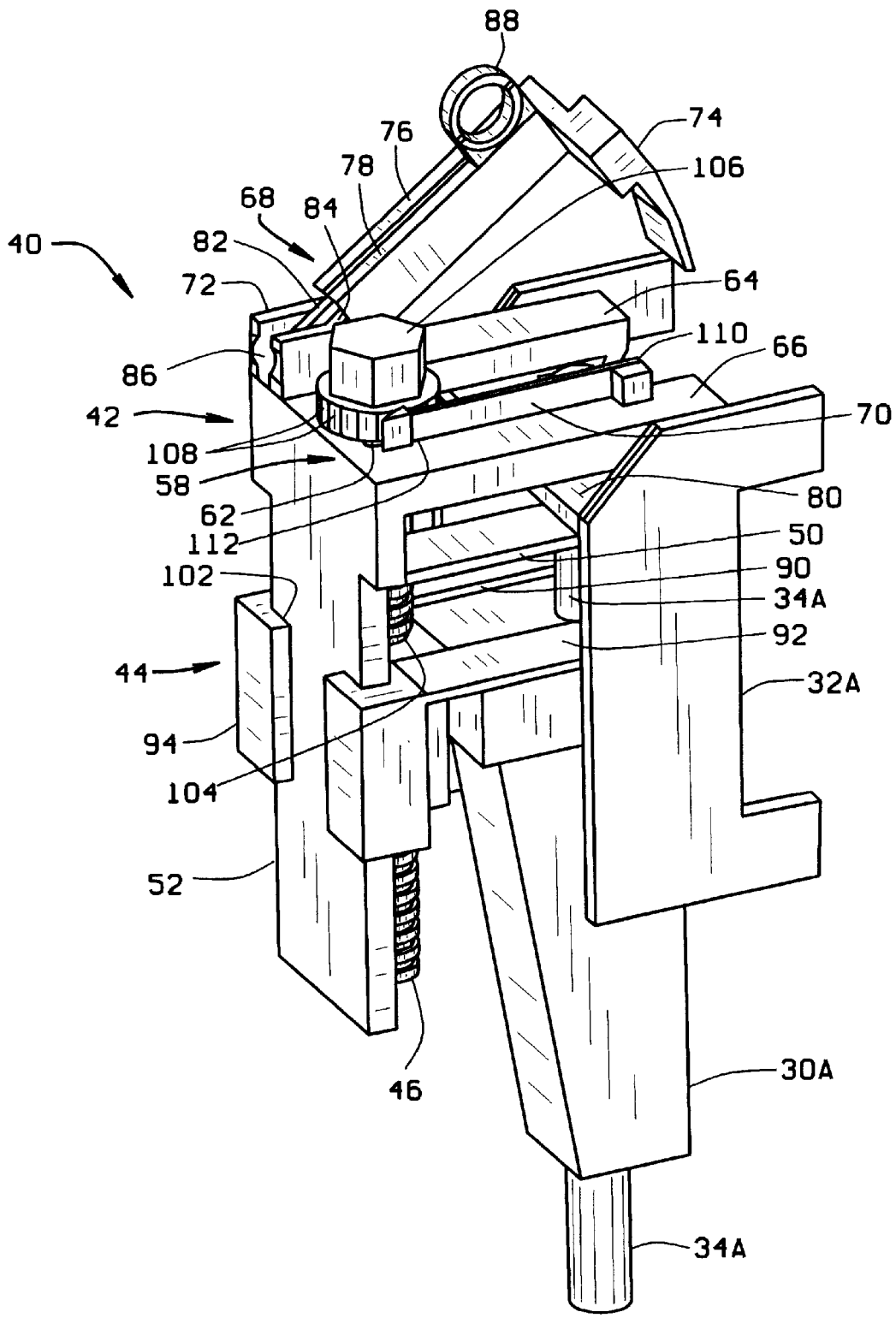
FIG. 4 is a top perspective view of the wedge locking support apparatus shown in FIG. 3, with the pivoting latch assembly shown in the open position.
Figure 5:
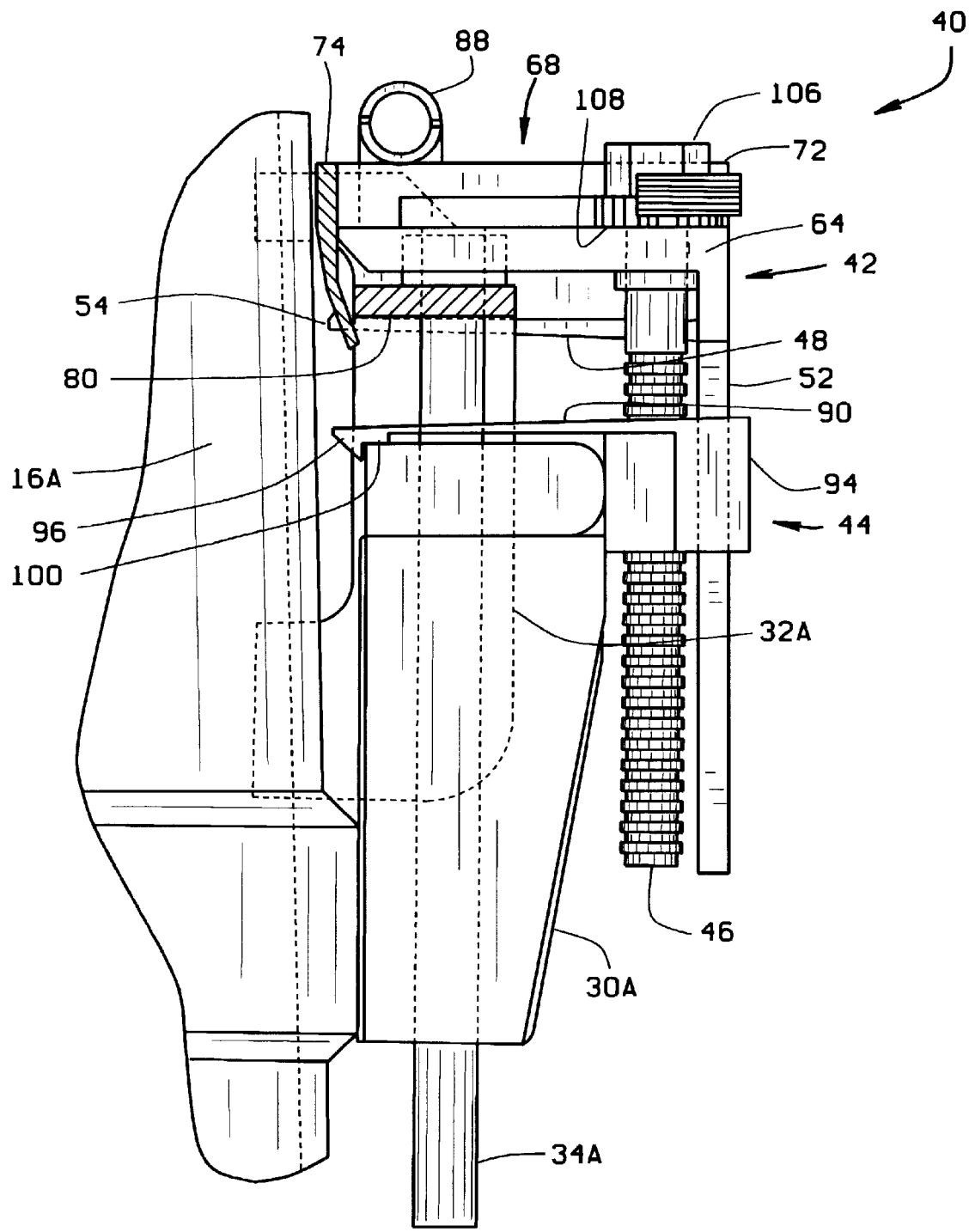
FIG. 5 is a side view of the wedge locking support apparatus shown in FIG. 4.

FIG. 3 is a bottom perspective view of a wedge locking support apparatus 40 in accordance with an embodiment of the present invention. FIG. 4 is a top perspective view of wedge locking apparatus 40 shown in FIG. 3. FIG. 5 is a side view of wedge locking apparatus 40. Referring to FIGS. 3. 4 and 5, wedge locking support apparatus 40 is configured to couple to wedge bracket 32A. Apparatus 40 is configured to impart a downward force on wedge 30A which will cause wedge 30A to slide down in wedge bracket 32A to maintain the tight fit-up between inlet mixer 16A (see FIG. 5) and restrainer bracket 28A (see FIG. 2) minimizing vibration causing set screws 36A or 36B (see FIG. 2) to loosen. Of course apparatus 40 may also be coupled to wedge bracket 32B (see FIG. 2) and work in conjunction with wedge 30B (see FIG. 2). In one embodiment, wedge locking support apparatus 40 includes an upper leaf spring assembly 42, a lower leaf spring assembly 44 slidably coupled to upper leaf spring assembly 42, and a jack bolt 46 coupled to upper and lower assemblies 42 and 44.

Upper leaf spring assembly 42 includes leaf spring arms 48 and 50 depending perpendicularly from a flat elongate portion 52 of upper assembly 42. Leaf spring arms 48 and 50 are located parallel to each other and are configured to straddle gravity wedge mounting bolt 34A. Positioning lugs 54 and 56 depend from the ends of spring arms 48 and 50 respectively, and are configured to engage wedge bracket 32A to hold apparatus 40 in place when a preload force is applied to gravity wedge 30A.

Upper leaf spring assembly 42 also includes a guide portion 58 depending perpendicularly from a first end 60 of elongate portion 52. Guide portion 58 includes a jack bolt opening 62. Two guide arms 64 and 66 depend from guide portion 58. Guide arms 64 and 66 are located adjacent leaf spring arms 48 and 50 of upper leaf spring assembly 42, and are configured to be aligned with leaf spring arms 48 and 50 respectively. Guide arm 64 includes a pivoting latch assembly 68 configured to lock wedge locking support apparatus 40 to gravity wedge mounting bracket 32A (see FIG. 2). A locking beam 70 coupled to guide arm 66 and is configured to engage jack bolt 46.

Pivoting latch assembly 68 is coupled to guide arm 64 by a pivot mount 72. Particularly, latch assembly 68 includes a latch hook 74 with parallel spring arms 76 and 78 extending therefrom. Latch hook 74 is configured to engage a horizontal portion 80 of wedge mounting bracket 32A. Ends 82 and 84 of spring arms 76 and 78 respectively are configured to couple to pivot mount 72. Pivot mount 72 includes a channel portion 86 configured so that when latch assembly is in a closed position ends 82 and 84 snap lock into engagement with channel portion 86 to prevent latch hook 74 from disengaging from wedge mounting bracket 32A. A lifting eye depends from latch spring arm 78. Lifting eye 88 is used to lower apparatus 40 into position on wedge 30A and wedge bracket 32A. FIG. 3 shows pivoting latch assembly in a closed position, and FIG. 4 shows latch assembly 68 in an open position.

Lower leaf spring assembly 44 includes leaf spring arms 90 and 92 depending from a block portion 94. Leaf spring arms 90 and 92 are configured to be aligned with leaf spring arms 48 and 50 of upper assembly 42. Leaf spring arms 90 and 92 are located parallel to each other and are configured to straddle gravity wedge mounting bolt 34A. Positioning lugs 96 and 98 depend from the ends of each spring arms 90 and 92, and are configured to engage a top edge 100 of gravity wedge 30A to hold apparatus 40 in place when a preload force is applied to gravity wedge 30A. Block portion 94 of lower assembly 44 includes a channel 102 configured to receive elongate portion 52 of upper leaf spring assembly 42 and slidably couple upper and lower leaf spring assemblies 42 and 44. Block portion 94 also includes a threaded jack bolt opening 104 configured to threadenly engage jack bolt 46.

Jack bolt 46 includes a bolt head 106 and a plurality of ratchet teeth 108 around the periphery of bolt head 106. Jack bolt 46 is configured to extend through jack bolt opening 62 in upper leaf spring assembly 42 and to threadenly engage jack bolt opening 104 in lower leaf spring assembly 44. A first end 110 of locking beam 70 is coupled to guide arm 66 of upper leaf spring assembly 42 and an opposite end 112 is configured to engage ratchet teeth 108 of jack bolt 46.

Wedge locking support apparatus 40 may be fabricated from any suitable material. Preferably, wedge locking support apparatus 40 is fabricated from Ni-Cr-Fe alloy X-750. Alloy X-750 provides high strength which permits minimum size and weight, resistance to thread galling, and corrosion resistance.

Wedge locking support apparatus 40 is installed on jet pump inlet mixer gravity wedge 30A by first preassembling the components. Particularly, elongate portion 52 of upper leaf spring assembly 42 is inserted into channel 102 of lower leaf spring assembly 44. Jack bolt 46 is then inserted through jack bolt opening 62 in upper spring assembly 42 and threadenly engaged with threaded jack bolt opening 104 of lower spring assembly 44.

Apparatus 40 is then lowered by lifting eye 88 into position on gravity wedge 30A so that upper leaf spring positioning lugs 54 and 56 engage horizontal portion 80 of wedge bracket 32A. Pivoting latch 68 is then closed to engage horizontal portion 80 of wedge bracket 32A, locking apparatus 40 to bracket 32A.

A socket tool (not shown) is then used to tighten jack bolt 46 to a predetermined torque which moves lower leaf spring arms 90 and 92 into engagement with gravity wedge 30A clamping apparatus 40 securely to wedge 30A and mounting bracket 32A. The action of upper leaf spring arms 48 and 50 engaging wedge bracket 32A and lower leaf spring arms 90 and 92 engaging the top of gravity wedge 30A imparts a downward force on wedge 30A as jack bolt 46 is tightened.

Leaf spring arms 48, 50, 90, and 92 are configured to deflect under the applied jack bolt 46 preload which permits apparatus 40 to maintain the load on wedge 30A even if gravity wedge 30A moves downward during operation of the reactor.

The above described wedge locking support apparatus 40 is remotely installable on an inlet mixer gravity wedge and improves the effectiveness of the wedge. The apparatus imparts a downward preload force to the wedge which supplements the force supplied by the weight of the wedge. Apparatus 40 maintains the load force on the gravity wedge even if the wedge moves downward during operation of the reactor.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A wedge locking support apparatus for a jet pump gravity wedge in a boiling water nuclear reactor, the gravity wedge including a mounting bolt and a wedge bracket, said wedge locking apparatus configured to couple to the gravity wedge, said apparatus comprising:

an upper leaf spring assembly;

a lower leaf spring assembly slidably coupled to said upper leaf spring assembly; and a jack bolt coupled to said upper and lower assemblies.

2. An apparatus in accordance with claim 1 wherein said upper leaf spring assembly comprises a first and a second leaf spring arm depending perpendicularly from a flat elongate portion, said first and second spring arms configured to straddle a gravity wedge mounting bolt.

3. An apparatus in accordance with claim 2 wherein said first and second spring arms comprise positioning lugs depending from a first end of said spring arms, said positioning lugs configured to engage the wedge bracket.

4. An apparatus in accordance with claim 2 wherein said upper leaf spring assembly further comprises a guide portion depending perpendicularly from a first end of said flat elongate portion, said guide portion comprising a first and a second guide arm extending therefrom, said first and second guide arms located adjacent said first and second leaf spring arms respectively and configured to be aligned with said first and second leaf spring arms.

5. An apparatus in accordance with claim 2 wherein said lower leaf spring assembly comprises a first and a second leaf spring arm depending from a block portion, said first and second spring arms configured to straddle the gravity wedge mounting bolt, and to be aligned with said first and second leaf spring arms of said upper leaf spring assembly.

6. An apparatus in accordance with claim 5 wherein said first and second spring arms of said lower leaf spring assembly comprise positioning lugs depending from a first end of said spring arms, said positioning lugs configured to engage a top edge of the gravity wedge.

7. An apparatus in accordance with claim 6 wherein said block portion comprises a channel configured to receive said elongate portion of said upper leaf spring assembly.

8. An apparatus in accordance with claim 7 wherein said block portion of said lower leaf spring assembly comprises a threaded jack bolt opening configured to threadenly engage said jack bolt.

9. An apparatus in accordance with claim 8 wherein said guide portion of said upper leaf spring assembly comprises a jack bolt opening configured to be in alignment with said threaded jack bolt opening in said lower leaf spring assembly.

10. An apparatus in accordance with claim 6 wherein said first guide arm comprises a latch assembly, said latch assembly comprising a latch hook portion with first and second spring arms depending therefrom, said spring arms configured to be parallel to one another, and a first end of said first and said second latch assembly spring arms are configured to pivotably couple to a pivot mount depending from said first guide arm of said upper leaf spring assembly, said pivot mount including a channel portion configured to engage said first and said second latch assembly spring arms, said latch hook portion configured to engage a horizontal portion of the gravity wedge mounting bracket.

11. An apparatus in accordance with claim 10 wherein said latch assembly further comprises a lifting eye portion depending from said latch hook portion, said lifting eye portion configured to permit said apparatus to be lowered into position in a nuclear reactor.

12. An apparatus in accordance with claim 1 wherein said jack bolt comprises a head and a plurality of ratchet teeth around the periphery of said jack bolt head.

13. An apparatus in accordance with claim 12 wherein said second guide arm of said upper leaf spring assembly comprises a locking beam, said locking beam comprises a first end and a second end, said first end configured to couple to said second guide arm, and said second end configured to engage said ratchet teeth of said jack bolt head.

14. A method of repairing a jet pump inlet mixer gravity wedge in a boiling water nuclear reactor, the wedge includes a mounting bolt and a mounting bracket, said method comprising the steps of:

coupling a wedge locking support apparatus to the wedge and the wedge mounting bracket, the wedge locking support apparatus comprising an upper leaf spring assembly, a lower leaf spring assembly slidably coupled to the upper leaf spring assembly, and a jack bolt coupled to the upper and lower leaf arm assemblies; and tightening the wedge locking support apparatus jack bolt to impart a downward force on the wedge.

15. A method in accordance with claim 14 wherein the upper leaf spring assembly comprises a first and a second leaf spring arm depending perpendicularly from a flat elongate portion, the first and second spring arms configured to straddle a gravity wedge mounting bolt, the first and second spring arms comprising positioning lugs depending from a first end of the spring arms, the positioning lugs configured to engage the wedge bracket.

16. A method in accordance with claim 15 wherein the upper leaf spring assembly further comprises a guide portion depending perpendicularly from a first end of the flat elongate portion, the guide portion comprising a first and a second guide arm extending therefrom, the first and second guide arms located adjacent the first and second leaf spring arms respectively and configured to be aligned with the first and second leaf spring arms.

17. A method in accordance with claim 16 wherein the lower leaf spring assembly comprises a first and a second leaf spring arm depending from a block portion, the first and second spring arms configured to straddle the gravity wedge mounting bolt, and to be aligned with the first and second leaf spring arms of the upper leaf spring assembly, the first and second spring arms of the lower leaf spring assembly comprising positioning lugs depending from a first end of the spring arms, the positioning lugs configured to engage a top edge of the gravity wedge.

18. A method in accordance with claim 17 wherein the block portion comprises a channel configured to receive the elongate portion of the upper leaf spring assembly, and further comprises a threaded jack bolt opening configured to threadenly engage the jack bolt.

19. A method in accordance with claim 18 wherein the guide portion of the upper leaf spring assembly comprises a jack bolt opening configured to be in alignment with the threaded jack bolt opening in the lower leaf spring assembly.

20. A method in accordance with claim 19 wherein the first guide arm comprises a latch assembly, the latch assembly comprising a latch hook portion with first and second spring arms depending therefrom, the latch spring arms configured to be parallel to one another, and a first end of the first and second latch assembly spring arms are configured to pivotably couple to a pivot mount depending from the first guide arm of the upper leaf spring assembly, the pivot mount including a channel portion configured to engage the first and second latch assembly spring arms, the latch hook portion configured to engage a horizontal portion of the gravity wedge mounting bracket, and the latch assembly further comprising a lifting eye portion depending from the latch hook portion, the lifting eye portion configured to permit the apparatus to be lowered into position in a nuclear reactor.

21. A method in accordance with claim 20 wherein the jack bolt comprises a head and a plurality of ratchet teeth around the periphery of said jack bolt head.

22. A method in accordance with claim 21 wherein the second guide arm of the upper leaf spring assembly comprises a locking beam, the locking beam comprising a first end and a second end, the first end configured to couple to the second guide arm, and the second end configured to engage the ratchet teeth of the jack bolt head.

* * * * *